March 19, 1963 B. A. BOSHER 3,082,033
AUTOMOBILE UTILITY TRUNK
Filed Oct. 10, 1961 5 Sheets-Sheet 1

INVENTOR
BENJAMIN A. BOSHER

BY *Raphael Semmes*

ATTORNEY

March 19, 1963 B. A. BOSHER 3,082,033
AUTOMOBILE UTILITY TRUNK
Filed Oct. 10, 1961 5 Sheets-Sheet 3

INVENTOR
BENJAMIN A. BOSHER
BY Raphael Semmes
ATTORNEY

March 19, 1963     B. A. BOSHER     3,082,033
AUTOMOBILE UTILITY TRUNK
Filed Oct. 10, 1961     5 Sheets-Sheet 4

INVENTOR.
BENJAMIN A. BOSHER
BY Raphael Semmes
ATTORNEY

March 19, 1963  B. A. BOSHER  3,082,033
AUTOMOBILE UTILITY TRUNK

Filed Oct. 10, 1961  5 Sheets-Sheet 5

INVENTOR.
BENJAMIN A. BOSHER
BY Raphael Semmes
ATTORNEY

United States Patent Office 3,082,033
Patented Mar. 19, 1963

3,082,033
AUTOMOBILE UTILITY TRUNK
Benjamin A. Bosher, Golf Course Road,
Owings Mills, Md.
Filed Oct. 10, 1961, Ser. No. 144,195
13 Claims. (Cl. 296—26)

This invention relates to automotive vehicle bodies and more particularly to a utility trunk compartment for a passenger automotive vehicle which is adapted to carry cargo of unrestricted height, and to the combination with the utility trunk compartment of a canopy type enclosure.

Conventional trunk compartments of sedan or coupe passenger automotive vehicles are quite restricted as to the volume and height of the cargo or load which may be carried in the trunk. When a motorist using a conventional four-door or two-door sedan or a coupe passenger automobile requires cargo-carrying capacity beyond that of the prior art trunk or baggage compartments provided on such vehicles, it is usually necessary to attach a trailer onto the rear of the passenger vehicle to carry the excess cargo. Such trailers are usually rented and are thus an additional expense to the motorist; also, the attachment of a trailer to a passenger vehicle adds to the hazards and complications of driving. Also a variety of baggage carriers designed for attachment to the roof of a passenger vehicle have had wide-spread usage. The utility trunk compartment with its canopy makes it unnecessary to use the roof for baggage storage.

Furthermore, the trunk cover of the conventional passenger automotive vehicle serves a function only when the trunk is closed, and does not serve any useful purpose or function when the trunk is open.

Accordingly, it is an object of this invention to provide a novel trunk compartment for passenger automotive vehicles which provides a greatly increased cargo-carrying capacity as compared to conventional trunk compartments of passenger automotive vehicles, and in which cargo of unrestricted height may be carried.

It is another object of this invention to provide an improved trunk compartment construction particularly suitable for passenger automotive vehicles and in which the trunk lid or cover means in addition to serving as the normal closure for the trunk or baggage compartment also serves additional functions when the trunk compartment is uncovered.

It is another object of the invention to provide a utility trunk for passenger automotive vehicles in which the trunk cover means includes cooperating complementary cover sections which may be moved to form an extension of the floor of the trunk and also to form a vertical cargo support.

Still another object of the invention is to provide a utility trunk construction for automotive vehicles in which the trunk cover includes two separately openable sections, each of which serves a distinct function when in open position, with the two sections cooperating to support cargoes of a different character than those normally supported by the trunk compartment of a passenger automotive vehicle.

A further object of the invention is to provide a trunk construction for an automotive vehicle including two co-operating separately openable cover sections having separate latch means.

A further object of the invention is to provide an improved latch mechanism for an automotive vehicle trunk cover.

A further object of the invention is to provide an improved automotive vehicle body and utility trunk construction which are adapted to receive and support a canopy framework and a canopy mounted thereon.

Still a further object of the invention is to provide a canopy supporting framework and enclosing canopy for attachment to an automotive vehicle, and an improved weatherproof sealing construction for a canopy enclosure.

In achievement of these objectives, there is provided in accordance with this invention an automotive vehicle including a utility trunk compartment which is closed by two complementary cover sections, including a lid section and a tailgate section, each of which may be opened independently of the other. The two complementary cover sections may be opened to a position in which the upper or lid section of the cover is in a vertical position while the tailgate section of the cover is in a horizontal position and forms a continuation of the floor of the trunk cavity. With the cover sections in the fully open position, cargoes of large volume and unrestricted height may be carried by the cargo compartment.

In accordance with a further feature of the invention, a canopy supporting framework and a canopy may be mounted over the trunk cavity. The canopy structure includes special sealing means along its edges which is locked into place by cam locks which insure a tight sealing relation of the canopy to the adjacent surfaces of the trunk lid and tailgate sections and to the portions of the passenger vehicle body bounding the trunk cavity.

Further objects and advantages of the invention will become apparent from the following description taken in conjunction with the accompanying drawings in which.

Referring now to the drawings, there is shown an automotive passenger vehicle generally indicated at 10 which may be, for example, a two-door or four-door sedan. Vehicle 10 includes at the rear thereof a trunk cavity or baggage compartment 12 having a floor 14 and vertical side walls 16, the walls 16 being formed by the portions of the vehicle body bounding the trunk cavity.

The trunk cavity or baggage compartment 12 is closed by a cover member which includes a lid section 20 and a tailgate section 22, these two cover sections being independently openable, and complementing each other to form a closure for the trunk cavity. When the trunk cover sections are closed, lid section 20 lies in a substantially horizontal plane to close the upper opening of the trunk cavity, while tailgate section 22 lies in a vertical plane to close the end opening of the trunk cavity. For brevity in description, the two cover sections just described will be referred to hereinafter as lid 20 and tailgate 22.

Figures 1, 2, 3, 4, 5:
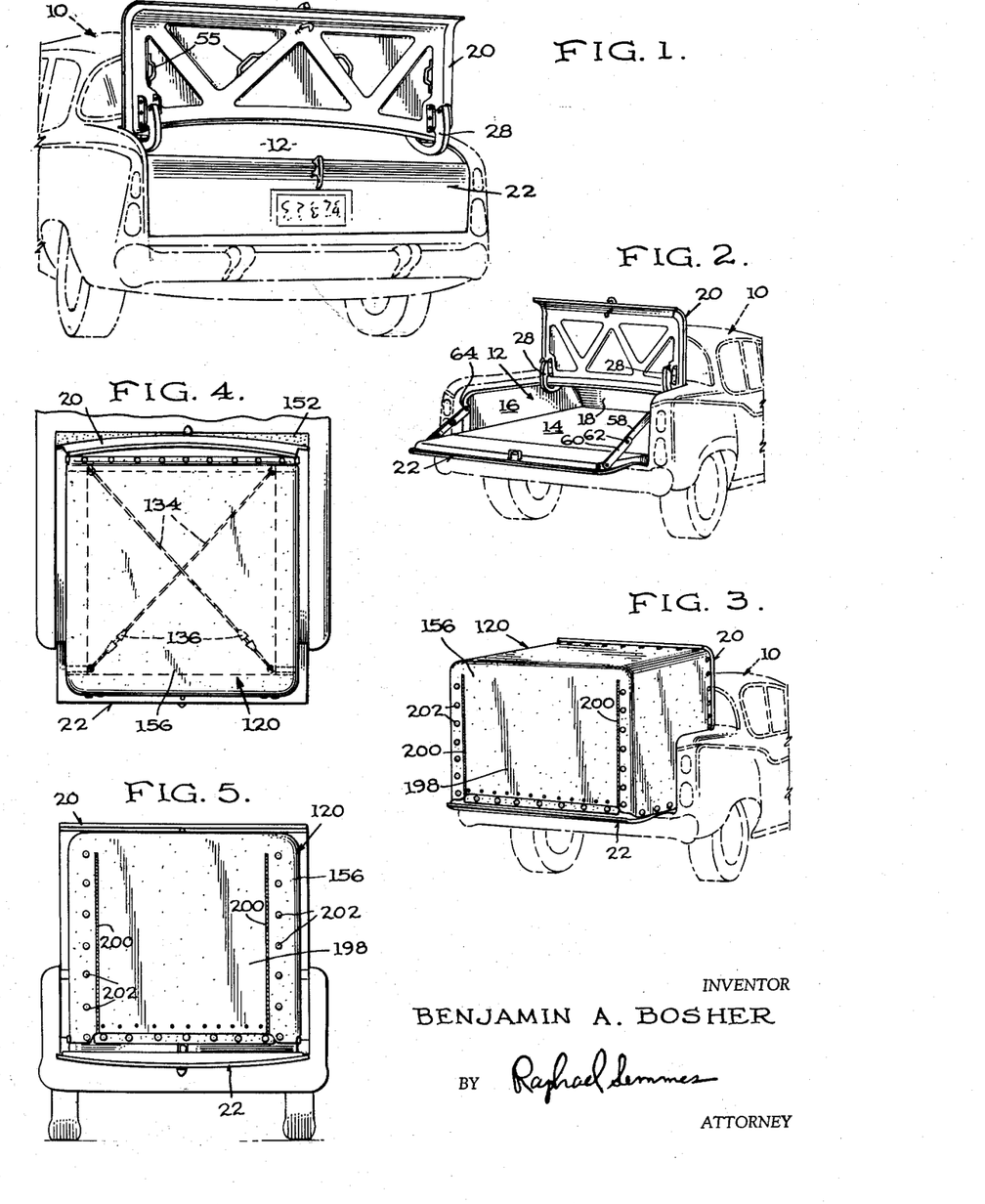
FIGURE 1 is a perspective view of the rear of an automotive vehicle having the utility trunk of the invention, showing the utility trunk with the upper lid section of the trunk cover in raised position and with the lower or tailgate section of the trunk cover in closed position.
FIGURE 2 is a perspective view of the automotive vehicle of FIGURE 1 with both trunk cover sections in fully opened position.
FIGURE 3 is a perspective view of the vehicle of FIGURES 1 and 2 showing a canopy structure mounted on the trunk compartment with both of the trunk cover sections in the fully opened position of FIGURE 2.
FIGURE 4 is a top plan view, partially cut away, of the canopy structure of the vehicle as shown in FIGURE 3, with the bracing means for the canopy framework being shown in dotted outline.
FIGURE 5 is an end view of the vehicle of FIGURE 3 with the canopy structure mounted thereon.
Figures 6, 6A:
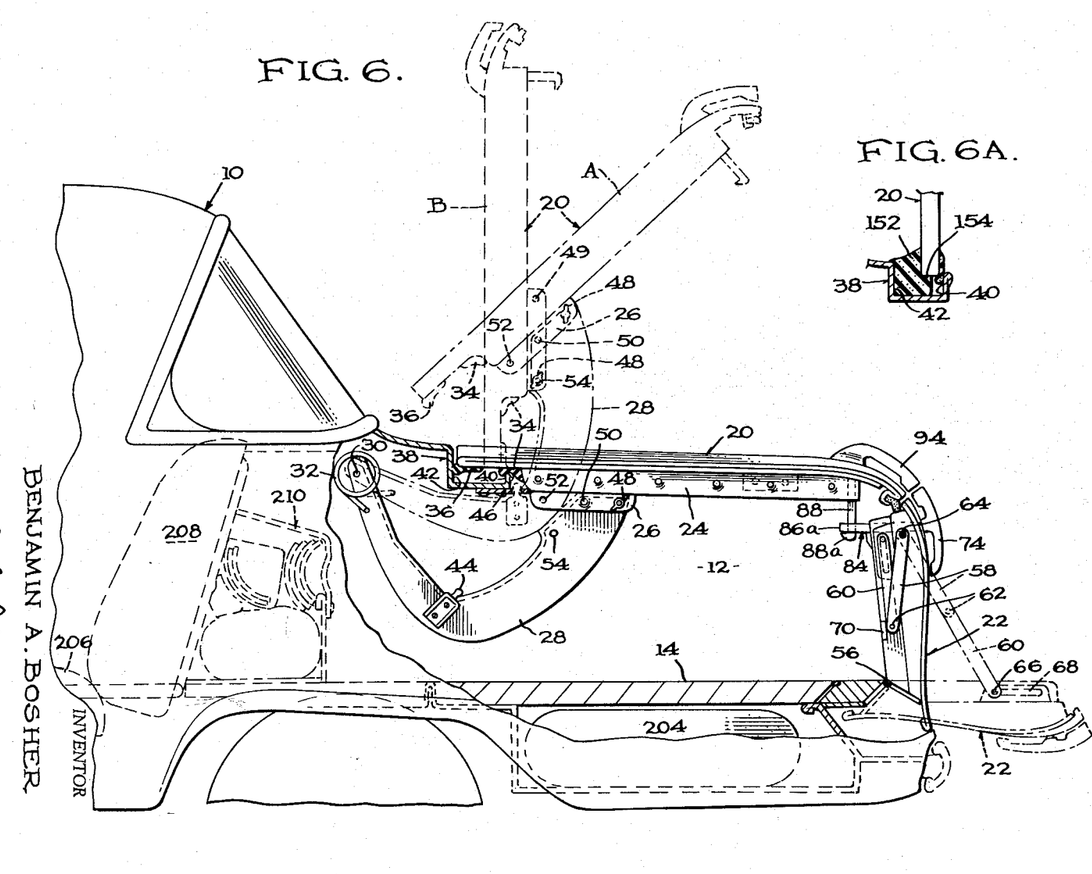
FIGURE 6 is a view of the rear part of the automotive vehicle showing the trunk compartment in longitudinal section and illustrating the closed position of the complementary trunk cover sections in full line and the open position of the trunk cover sections in dotted outline.
FIGURE 6a is a fragmentary view showing the supplementary gasket which is used to seal the trunk lid section when the lid is in vertical position.
Figures 7, 8:
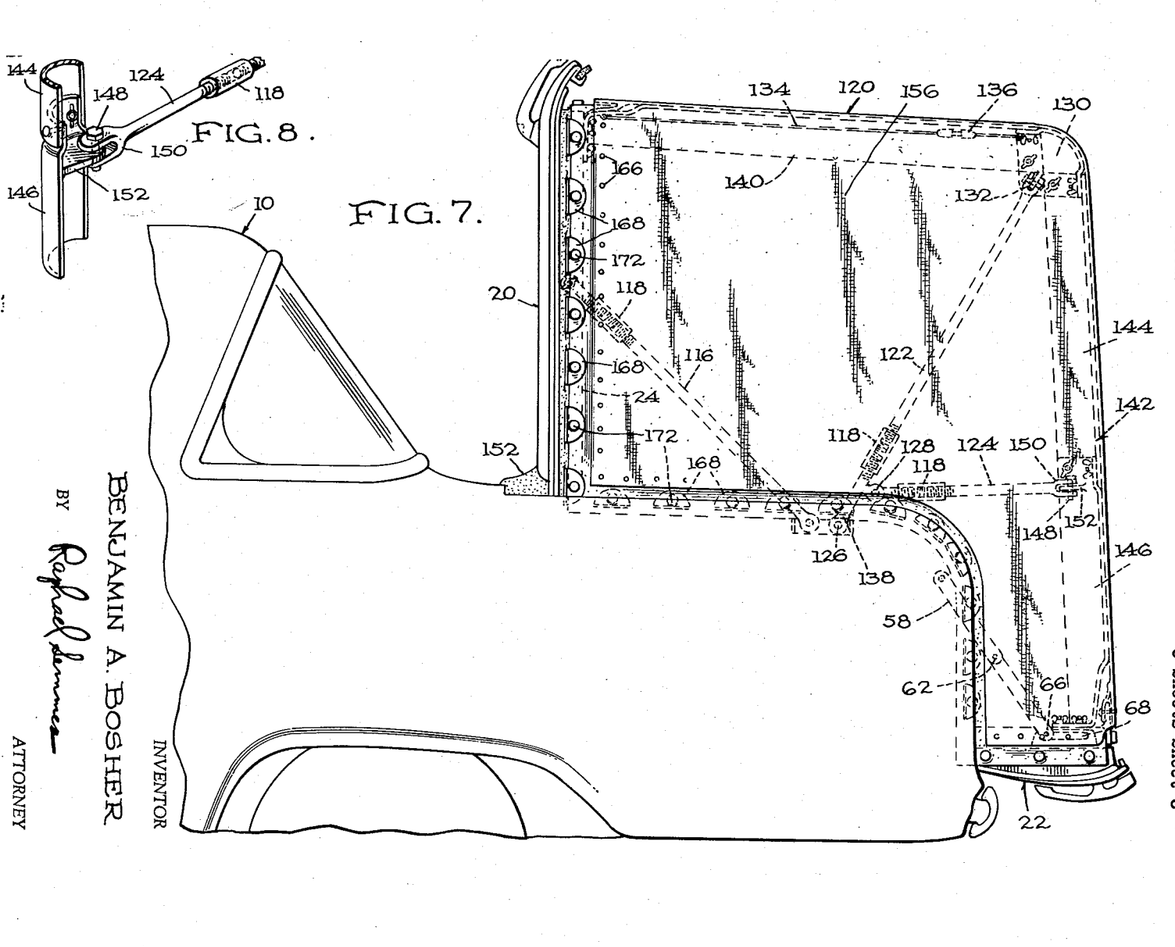
FIGURE 7 is a side elevational view of the automotive vehicle with the trunk cover sections in fully opened position and with the canopy structure mounted thereon, the supporting framework beneath the canopy being shown in dotted outline.
FIGURE 8 is a perspective view showing a detail of the attachment of the canopy support rod to the vertical frame member.
Figures 9, 10, 11:
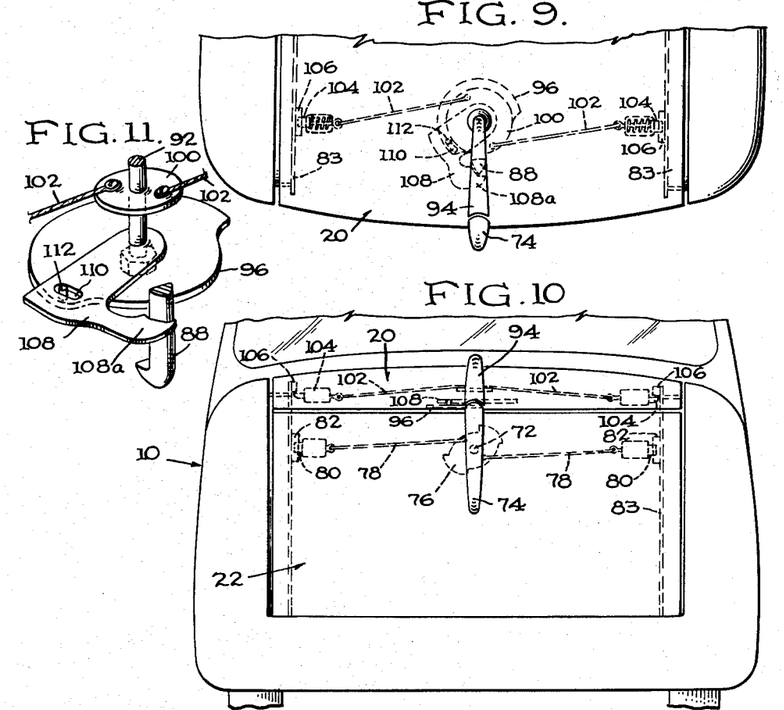
FIGURE 9 is a top plan view, partially broken away, of the rear end of the trunk compartment with both cover sections closed and illustrating in dotted outline the latch mechanism of the upper lid of the trunk.
FIGURE 10 is a rear elevational view, partially broken away, of the trunk compartment end of the automotive vehicle, illustrating in dotted outline the latching mechanism of both the upper lid cover section and of the tailgate cover section of the trunk assembly.
FIGURE 11 is an enlarged perspective view of a portion of the latching mechanism of the upper lid section of the trunk compartment.

Attached to the inner or underneath surface of lid 20, and on each of the opposite longitudinal edges thereof, as best seen in FIG. 6, are longitudinal frame elements 24. A separate hinge bracket 26 is attached to the forward end of each of the longitudinal frame elements 24 of lid 20. Trunk lid 20 is supported for swinging movement upwardly and forwardly to open position by a pair of dog leg hinge arms 28. Each dog leg hinge arm 28 has its rearwardly positioned end attached to hinge bracket 26 and its forward end supported for pivotal movement about a pivot 30 at a point in the upper forward end of the trunk cavity adjacent and below the bottom molding of the rear window of the automotive vehicle. A separate counterbalance torsion spring 32 is engaged by the pivotal end of each hinge arm 28 in such manner that spring 32 is torsionally stressed when the lid 20 is in the closed position shown in full line in FIG. 6. The springs 32 acting on the two opposite hinge arms 28 have energy stored therein by the closing of lid 20 so that when the lid 20 is unlatched, the stored energy in torsion spring 32 moves the lid 20 to the position A shown in dotted outline in FIG. 6 in which the lid is at an angle of substantially 60 degrees with respect to the horizontal.

Lid 20 carries on the forward end thereof sealing strips 34 and 36 which engage the surfaces 40 and 42 of the channel-shaped forward cross frame 38 of the trunk cavity which extends transversely of the vehicle body a short distance rearwardly of the rear window molding. A guide pin 44 located on each hinge arm 28 intermediate the length thereof engages a corresponding guide pin receiver 46 mounted on the under surface of the channel-shaped cross frame 38. When the upper lid section 20 is unlatched and is moved upwardly by the force of torsion springs 32, each guide pin 44 engages its corresponding guide pin receiver 46 to prevent further upward movement of the hinge arms 28 and to properly locate the hinge arms. Both the guide pins 44 and guide pin receivers 46 may be adjustable. A slide latch (not shown) may be mounted on the guide pin receiver 46 and may be moved to engage a notch in the guide pin 44 when the lid 20 is in vertical position to thereby lock the hinge arms 28 to the cross frame 38.

For large bulky loads and also when the canopy structure to be hereinafter described is mounted over the trunk cavity, it is desirable to move the trunk lid 20 from the position A shown in dotted outline in FIG. 6 in which the trunk lid is at an angle of substantially 60 degrees with respect to the horizontal, to a vertical position as indicated in dotted outline at B in FIG. 6 in which the lid 20 is at a 90 degree angle with respect to the horizontal. In order to move the trunk lid from the 60 degree or A position to the 90 degree or B position as shown in FIG. 6, the thumb screw 48 attaching hinge bracket 26 to hinge arm 28 is unscrewed and removed from engagement with the rearmost aperture 49 in hinge bracket 26, and from engagement with the corresponding screw-threaded passage in hinge arm 28. The lid 20 is then swung 30 degrees about the pivotal connection 50 of bracket 26 to hinge arm 28 until the frontmost aperture 52 of hinge bracket 26 is in registry with frontmost screw-threaded passage 54 of hinge arm 28. Thumb screw 48 is then inserted through aperture 52 and into engagement with screw-threaded passage 54 to hold the trunk lid 20 in the vertical or 90 degree position indicated in dotted outline at B in FIG. 6. Thus, the lid 20 is provided with a double acting hinge support means.

Cleats 55 through which straps may be passed are located along the structural ribs of the lid 20 to provide suitable lashing points for cargo carried by compartment 12.

The tailgate section 22 forms the rear end cover of the utility trunk 12 and is attached to floor 14 of trunk 12 by a piano hinge 56 about which tailgate section 22 may be swung downwardly and rearwardly to open position so that when tailgate 22 is in the open or horizontal position shown in dotted outline in FIG. 6, the inner or forwardly facing surface of tailgate 22 forms a smooth continuation of the floor 14 of the trunk compartment 12. The tailgate 22 is connected to each of the opposite sides of the rear end of the vehicle body by a linkage including links 58 and 60 which are pivotally connected to each other at point 62. The opposite or upper end of link 58 is pivotally connected to the vehicle body at point 64 while the opposite end 66 of link 60 is slidably movable in a slot 68 in the end edge of tailgate 22. A stop 70 carried by the vehicle body and the provision of slot 68 in the tailgate permit the knee action linkage 58—60 to fold properly when the tailgate is raised from the open or horizontal position shown in dotted outline in FIG. 6 to the closed or vertical position shown in full line in FIG. 6.

*Trunk Latch and Lock Mechanism*

The tailgate 22 and the lid 20 of the trunk are provided with latch and lock mechanisms such that either the lid or the tailgate may be opened and closed independently of each other.

As best seen in the views of FIGS. 8–15, inclusive, the latching mechanism for the tailgate 22 includes an operating shaft 72 which extends through and is supported by a suitable bearing in the tailgate 22 adjacent the upper edge of tailgate 22 and centrally of the transverse dimension of the tailgate, shaft 72 having mounted on the outer end thereof an operating handle 74. A cam plate 76 is mounted on and rotates with operating shaft 72 adjacent the interior surface of tailgate 22. Cam plate 76 has connected thereto cables 78 which operate spring-loaded slide catches 80 which engage stationary latches 82 mounted on the U-shaped channel 83 which gives structural stiffness to that portion of the vehicle body forming the trunk cavity. When the slide catches 80 are in latched position they serve to hold the edges of tailgate 22 securely in closed position so that rubber sealing strips (not shown) mounted on the tailgate are compressed against the vertical portion of the U-shaped channel 83 bounding the opening which is closed by tailgate 22.

Figures 12, 13, 14:
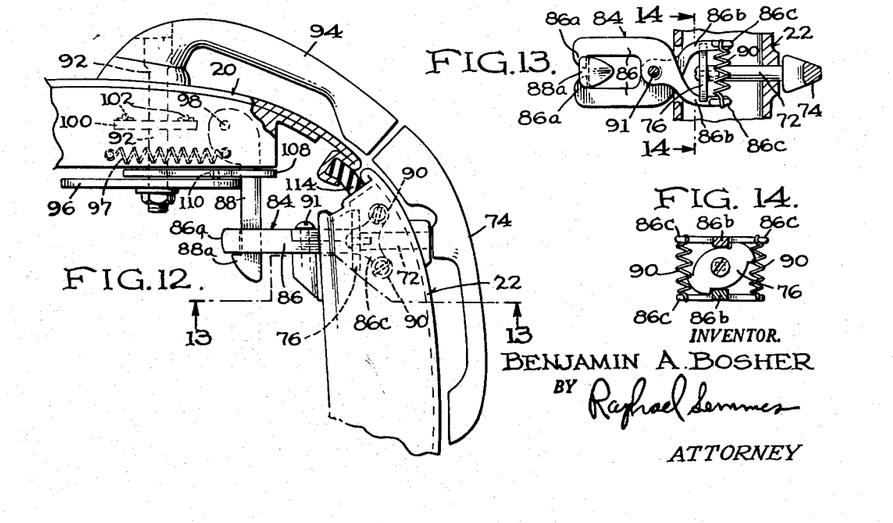
FIGURE 12 is a side elevational view, partly in section, of the latching mechanism for both the upper lid and the tailgate sections of the trunk assembly.
FIGURE 13 is a bottom plan view of the scissors-like latch member of the tailgate section of the trunk assembly, illustrating its interlocking engagement with the depending pivoted lug member of the upper latch assembly.
FIGURE 14 is a view in transverse section along line 14—14 of FIGURE 13 illustrating the engagement of the cam member operated by the latch handle of the lower tailgate cover section and its cooperating engagement with the scissor latch of the tailgate latch assembly.
Figure 15:
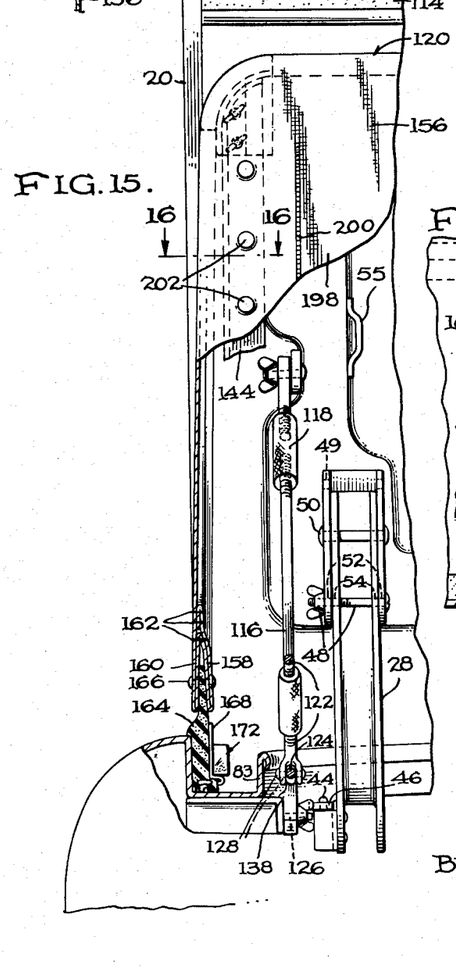
FIGURE 15 is a view in rear elevation of the trunk compartment with the canopy structure mounted thereon, and broken away to illustrate details of the dog leg hinge structure upon which the upper trunk lid is mounted and also of the details of the bracing rod which braces the upper trunk lid in vertical position, the sealing arrangement for the canopy being shown in section.
Figure 16:
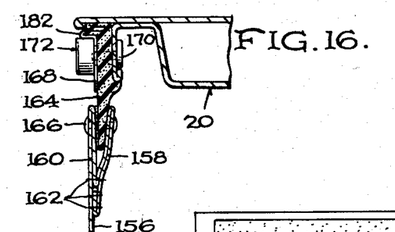
FIGURE 16 is a view in horizontal section along line 16—16 of FIGURE 15 illustrating details of the canopy member and its sealing arrangement.

As best seen in the views of FIGS. 12–14, cam plate 76 mounted on operating shaft 72 also cooperates with a scissor-type latch generally indicated at 84 including a pair of crossed arms 86, the forward ends 86a of which latchingly engage the vertical lug or spike 88 which forms a part of the latch mechanism of the upper trunk lid 20 as will be described more fully hereinafter. The forward ends 86a of the scissor-latch 84 are biased into normally latching engagement with respect to the spike 88 by spring members 90 which extend between the rearward ends 86b of scissor arms 86 on the opposite side of the pivot point 91 of the scissor latch from that on which the latch ends 86a are located. Each of the ends 86b of the scissor latch arms 86 is provided with spaced fork ends 86c (FIG. 14) with one of the springs 90 extending between the corresponding fork ends 86c of the respective scissor arms 86.

To open tailgate 22 from its latched position, operating handle 74 is rotated in a clockwise direction to thereby rotate cam plate 76. The rotation of cam plate 76 is effective to operate cables 78 to retract the catches 80 from latches 82 and, at the same time, the rotation of cam plate 76 is effective to cam scissor latch arms 86 out of latching engagement with respect to the vertical lug or spike 88. With catches 80 withdrawn from latches 82 and with scissor arms 86 cammed to open position with respect to spike 88, tailgate 22 can then be opened downwardly without disturbing trunk lid 20.

As best seen in FIG. 12, the latching and locking mechanism for upper lid section 20 includes an operating shaft 92 which extends in a vertical plane, when lid 20 is in closed position, through the lid 20, and has mounted on the outer end thereof an operating handle 94 by means of which operating shaft 92 may be rotated. A cam plate 96 is attached to and rotatable with the lower or inner end of operating shaft 92. With the trunk lid 20 in closed position, if the handle 94 is turned clockwise, cam plate 96 rotates the spike member 88 against a biasing spring 97 rearwardly about the pivot support 98 at the upper end of spike 88, to thereby permit the lower notched end 88a of spike 88 to swing pivotally out of engagement with respect to the latch ends 86a of scissor latch 84. A plate 100 is mounted on operating shaft 92 above cam plate 96 and has attached thereto cables 102 (FIG. 9) which operate catches 104 which engage latches 106 in a manner similar to that previously described in connection with the cables 78, catches 80 and latches 82 of the tailgate latch mechanism. Thus, when operating handle 94 of trunk lid 20 is rotated clockwise to rotate operating shaft 92 in a clockwise direction, cam plate 96 is rotated to pivotally move latch end 88a out of latching engagement with respect to scissor latch 86, the movement of operating shaft 92 also being effective to rotate plate 100 to actuate cables 102 to retract catches 104 from latches 106. This permits the trunk lid to be opened upwardly without disturbing the tailgate.

Means are also provided to lock spike 88 against pivotal movement to thereby prevent undesired unlatching movement of the spike 88 with respect to the scissor latch 84. This locking mechanism includes a locking stop member 108 which is mounted on operating shaft 92 and which lies directly above cam plate 96. Stop member 108 is pivotally movable on shaft 92, and a lost motion connection is provided between cam plate 96 and the stop 108, stop 108 being provided with a slot 110 which receives a pin 112 carried by the upper surface of cam plate 96. The stop member 108 includes a tongue portion 108a which is adapted to move into locking position behind the pivotally mounted vertical spike 88 when shaft 92 is rotated 30 degrees in a counterclockwise direction.

When closing the lid 20, operating handle 94 should be in the fore-and-aft position. In this position of handle 94, cam plate 96 is so positioned relative to stop member 108 that the tongue portion 108a of stop 108 is not in locking position behind spike 88. As lid section 20 is moved downwardly, the notched end 88a of spring loaded spike 88 latches under the latching end 86a of scissor latch 84. With the cover of upper lid section 20 closed and assuming that the tailgate section 22 is also closed, the sealing strip 114 carried by the lower edge of trunk lid 20 prevents leakage at the joint between trunk lid 20 and tailgate 22.

To lock spike 88 rigidly in position to prevent accidental or undesired release thereof, operating handle 94 is rotated 30 degrees counterclockwise after trunk lid 20 is closed and handle 94 is then returned to the fore-and-aft position. The 30 degree counterclockwise movement of handle 94 causes pin 112 carried by the upper surface of cam plate 96 and moving in slot 110 of stop 108 to move stop 108 to a position in which the end tongue portion 108a of stop 108 latches behind spike member 88. Handle 94 is then returned to the fore-and-aft position without releasing stop member 108 from its locking engagement with respect to spike 88 due to the lost motion provided between cam plate 96 and stop member 108. Similarly when it is desired to open trunk lid 20, handle 94 is moved in a clockwise position from its fore-and-aft position, pin 112 carried by cam plate 96 engaging stop 108 and moving stop 108 out of locking position behind spike 88. Further clockwise rotation of handle 94 causes cam 96 to move spike 88 rearwardly about its pivotal support 98 to permit raising of trunk lid 20. For reasons of simplicity of design in proving the practicability of this trunk latch mechanism, the latching components (84 and 88) have been shown extending beyond the structural inner surface of the lid and tailgate. It can readily be deduced that a more sophisticated design would allow this component to be recessed below the inner structural surface of both lid and tailgate so that the mounting of cargo on or adjacent to these structural members would in no way be restricted.

If the trunk lid is to be used as a cargo support and latching ropes are to be fastened to it, or if the canopy structure illustrated in FIGS. 3, 4, 5 and 7 is to be mounted over the trunk cavity, the trunk lid 20 is moved to the vertical position B as previously explained and the lid support rods 116 are fastened in position to give the necessary support to the lid in its vertical position to allow it to carry the loads which are imposed either by the lashed cargo or by the canopy structure. Each support rod 116 includes apertures at each of the opposite ends thereof through which thumb screws are threaded into engagement with threaded passages in the underframe of the top lid at one end of the support rods 116 and to an attachment point on the side of the trunk cavity at the opposite end of support rods 116. The support rods 116 have threaded adjustment sleeves 118 which permit adjustment of the length thereof.

*Description of Canopy Support Framework and Canopy Structure*

The canopy structure generally indicated at 120 may be mounted over the trunk cavity when the trunk lid 20 is in the vertical position indicated at B in FIG. 6 and when the tailgate 22 is in its open or horizontal position. With the trunk lid 20 and tailgate 22 in the positions just mentioned, and with the support rods 116 in position as previously described to give the necessary support to the trunk lid 20 in its vertical position, the canopy framework may then be erected.

The canopy framework includes on each side of the vehicle two canopy support rods 122 and 124. Support rod 122 is fastened at one end by thumb screws to the attachment point 126 on the side of the trunk cavity adjacent the connection of support rod 116. Support rod 124 is permanently pivotally connected to the rod 122 at pivotal connection 128. Each of the rods 122 and 124 is provided with a screw-threaded adjustment sleeve 118. The two rods 122 and 124 on each side of the canopy framework may be folded together for storage purposes about the pivotal connection 128.

A cross frame member 130 is permanently attached to the upper end of the rod 122 at point 132. The cross frame member 130 may be made of a tough, waterproof plastic material such as epoxy resin reinforced with Fiberglas cloth. Two bracing stays 134 are permanently attached to opposite ends of the molded cross frame member 130 by means of wire grommets at the ends of the bracing stays which are suitably attached by rivets to cross frame member 130. Turnbuckles 136 are incorporated as part of the bracing stays 134.

During assembly of the canopy framework, a shoulder 138 formed on the lower end of support rod 122 forms a stop against a cooperating portion of the trunk side wall so that the cross frame member 130 is held close to its proper position. Molded longitudinal frame members 140 extend between the opposite ends of the cross frame member 130 and the corresponding opposite sides of the upper end of trunk lid 20. Each longitudinal molded frame 140 has an end which telescopes into contiguous relation to the inner surface of cross frame member 130 and is attached thereto by thumb screws. The opposite end of each longitudinal molded frame member 140 is attached by thumb screws to trunk lid 20.

The supporting framework for the canopy also includes at each side of the vehicle vertical frame members generally indicated at 142 which, to facilitate storage, are formed in two sections 144 and 146. Vertical frame members 142 are of arcuate cross section. The two adjacent ends of sections 144 and 146 of each vertical member telescope together and are suitably joined by thumb screws. The vertical support member 142 at each side of the canopy framework is joined by thumb screws at its upper and lower ends respectively to the cross frame member 130 and to the tailgate 22 in its horizontal position. Support rod 124 is next connected to the composite vertical support 142 by means of a threaded fastening 148 which extends through a yoke end 150 on support rod 124, fastening 148 also extending through suitable eyelet 152 or the like carried by the inner surface of the arcuate vertical support member 142. The threaded adjustment collars 118 on all of the support rods are then adjusted to make the canopy frame relatively rigid. Finally, the two bracing stays 134 are connected by yoke and eye connections to the trunk lid to provide diagonal cross bracing at the top of the canopy frame. The turnbuckles 136 are then tightened to make the top of the canopy framework sturdy and plumb. A preformed sponge rubber gasket 152 is then forced into the opening between the rear deck of the vehicle body and the vertically positioned trunk lid 20, as best seen in FIG. 6a. The gasket 152 includes a shoulder 154 which snaps into place beneath the bottom edge of the trunk lid 20 to securely hold the gasket 152 in position.

After the canopy supporting framework is erected in the manner just described, the one-piece canopy 156 which may be of the standard multiple-ply canvas used for convertible auto tops, or from rubberized nylon, Orlon, or other suitable fabric, is spread over the supporting framework starting at the rear and pulling the canopy forwardly. The canopy will be described as being made of canvas, but it will be understood that other suitable fabrics may be used, as just mentioned.

Figure 18:
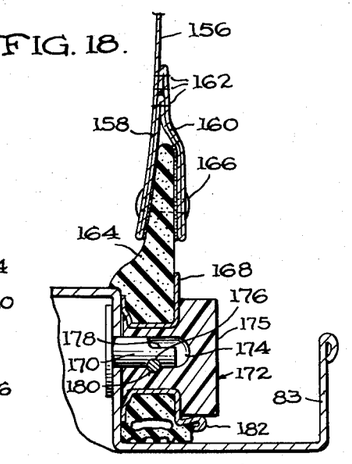
FIGURE 18 is an enlarged view in vertical section along line 18—18 of FIGURE 17 further illustrating the canopy sealing structure and the sealing cam member of the canopy.

As best seen in the view of FIG. 18, the canvas canopy 156 is provided with two spaced folds 158, 160 along its outer edge, the inner ends of the folds being joined to each other and to the main body of the canopy by three rows of stitching as indicated at 162. A rubber sealing strip 164 fits between the two folds 158 and 160 at the edge of the canvas and is secured thereto by metal rivets 166 positioned on approximately 2-inch centers. The rubber sealing strip 164 is provided at spaced intervals along the length thereof with metal grommets 168 which are adapted to engage hold-down pins 170 which extend at spaced intervals along the edge of the channel 83 which lies along the edge of the vehicle body portion bounding the trunk cavity. The hold-down pins 170 are also positioned at spaced intervals along the length of longitudinal frame elements 24 which project from the undersurface of the trunk lid 20, frame elements 24 extending vertically when the trunk lid 20 is in the vertical position shown in FIG. 7. Pins 170 also extend along the edges of tailgate 22.

A locking cam 172 which is preferably formed of nylon is carried by each of the grommets 168 for cooperation with hold-down pins 170 as will be described. Each locking cam 172 includes an axial recess 174 which is eccentrically located with respect to the outer circumference of the head portion 175 of cam 172, recess 174 being adapted to receive hold-down pin 170. Each cam 172 is permanently affixed to its respective grommet 168 and thus to canopy 156 due to the fact that the end of the locking cam opposite the head portion 175 of the cam is peened so as to prevent removal of the locking cam from the grommet 168 but permitting rotation of the cam relative to the grommet without axial displacement of the cam relative to the grommet.

Figure 17:
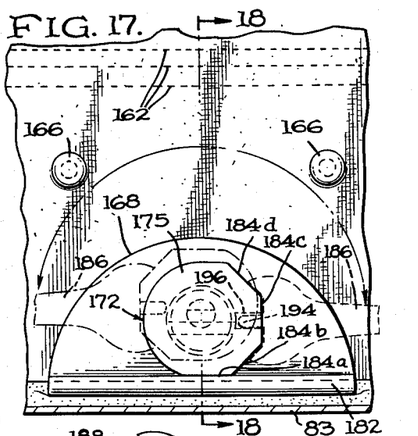
FIGURE 17 is a view in vertical elevation illustrating one of the locking cams connected to the sealing strip of the canopy.

As best seen in FIG. 17, the head 175 of locking cam 172 is provided along 180 degrees of its periphery with four flat edges 184, each of which subtends an angle of 45 degrees.

In attaching the canopy 156 to hold-down pins 170, the grommet with the attached cam 172 is slipped over the hold-down pin 170 with the axial passage or recess 174 of the cam receiving the hold-down pin. Cam 172 is provided with a hard brass pin 176 extending transversely of the axis of the cam, and the hold-down pin 170 is provided with a flat surface 178 extending from the end of the pin for a portion of the length thereof. Pin 170 is also provided with a groove 180 opposite the termination of the flat surface 178.

Figure 19:
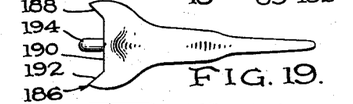
FIGURE 19 is a front elevational view of the special tool used to rotate the locking cam of the canopy seal.
Figure 20:
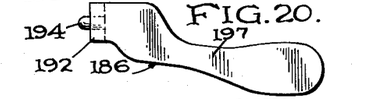
FIGURE 20 is a top plan view of the special tool of FIGURE 19.

When the grommet 168 and attached locking cam 172 are first positioned over the hold-down pin 170, the cam is in an angular position corresponding to the dotted outline view in FIG. 17 in which the pin 176 engages the flat surface 178 of hold-down pin 170. After the locking cam 172 and grommet 168 have been pushed onto the hold-down pin 170 for the entire distance possible, the special wrench 186 shown in FIGS. 19 and 20 is engaged with the head portion of the locking cam and rotates the locking cam 180 degrees from the dotted outline position shown in FIG. 17 to the full line position of FIG. 17. During the 180 degree movement, pin 176 is rotated from the flat surface 178 of the hold-down pin 170 to the groove 180 at the diametrically opposite side of the pin 170, thereby locking the canopy 156 and sealing strip 164 to the hold-down pin 170. At the same time, due to the fact that the circumference of the head portion 175 of the cam 172 is eccentric with respect to the axis of rotation of the cam, the contour of the cam head creates an overcenter locking action against the spring force of the rubber-supported metal edge 182 of metal grommet 168, and as the head of the locking cam 172 rides up onto the flat edge 184a of the cam, the locking cam is positively prevented from further rotation in a clockwise direction. The termination of the groove 180 in pin 170 also prevents the locking cam 172 from being turned further in a clockwise direction. In this position of locking cam 172, sealing strip 164 is tightly compressed against the adjacent surface of the lid 20, tailgate 22, or channel 83 of the vehicle body.

The special wrench generally indicated at 186 has three flat edges 188, 190 and 192, which engage three adjacent flat edges 184b, 184c, 184d of cam head 175. A pin 194 extends from the center of the edge 190 of the wrench and engages a hole 196 in the corresponding edge 184b of cam head 175. The construction of the wrench 186 and the cooperating shape of the cam head 175, together with the engagement of pin 194 on the wrench with the hole 196 in the cam head, permits the wrench 186 to grip the head of the locking cam 172 and readily turn it 180 degrees clockwise to fasten the canopy in place securely or to rotate the cam 172 in a counterclockwise direction for releasing the cam from its locking engagement. The handle 197 of the wrench is offset to provide ample clearance from the canopy when the wrench is being used to turn the locking cam.

The canopy is fastened from the exterior of the vehicle around the trunk lid 20 and tailgate 22, since hold-down pins 170 extend outwardly from the lid and tailgate. On the other hand, the canopy is fastened from the interior of the enclosure along the sides of the trunk since hold-down pins 170 project toward the interior of the vehicle from the wall of the channel member 83 which bounds the sides of the trunk cavity. The arrangement just described allows the joints between the canopy and the vehicle body to be sealed most efficiently.

The rear end of the canopy has a large flap 198 which may be opened and closed by means of two waterproof zippers 200, one on each side of the flap. Along the outer edge of each of the zippers 200, the canopy is fastened to each of the vertical frame members 142 by means of special fasteners in the form of nylon screws 202 having a head similar to that the nylon locking cam 172 previously described, to permit the same special tool 186 to be used for tightening the nylon screws after initially being screwed in by hand as was used for turning the locking cams 172. Threaded inserts are properly located in the vertical members 142 to receive the special nylon screws 202. With the rear end of the canopy secured in this manner, it is safe to allow the flap 198 to remain in the open position while the vehicle is under way.

The spare tire 204 is recessed beneath the floor of the trunk. The back 208 of the rear seat 206 in the vehicle folds forwardly and downwardly and the rear seat 206 folds forwardly and upwardly to extend the floor of the utility trunk compartment as in present-day station wagons. On the back 208 of the rear seat 206 is located a collapsible rack 210 for storing the canopy, canopy frame, and other related components.

It can be seen from the foregoing that there is provided in accordance with this invention an improved cargo compartment for automotive vehicles which has great utility since it permits the cargo compartment to carry loads of much greater volume and height than is permissible with trunk compartments of prior art constructions. The provision of the complementary, separately openable cover sections, including the upper trunk lid section and tailgate section which cooperate to form a closure for the trunk cavity, provide a unique closure for the cargo compartment of an automotive vehicle since this construction permits the trunk cover to be used for functions not possible in the prior art, including providing a lashing support for cargo, as well as a support for a canopy structure mounted over the trunk cavity. The easily attachable and detachable trunk canopy framework and the canopy carried thereby, together with the cam locking sealing arrangement for the edges of the canopy, provide structural features which are of great practical utility.

The cargo compartment of the invention, and the canopy structure mounted thereon, are suitable for use with passenger vehicles including four-door and two-door sedans, as well as with coupe bodies.

While there have been shown and described particular embodiments of the invention, it will be obvious to those skilled in the art that various modifications and changes may be made therein without departing from the invention, and, therefore, it is aimed to cover all such changes as fall within the true spirit and scope of the invention.

What I claim as my invention is:

1. An automotive vehicle comprising a trunk compartment at the rear thereof, a trunk cavity therein, a pair of complementary cover members for said trunk compartment, including first and second cover sections which, together, form a closure for the trunk cavity, double acting hinge support means mounted at one end on a main pivot located within the trunk cavity and extending transversely of the longitudinal axis of the vehicle, the opposite end of said hinge support means pivotally supporting said first cover section on a supplemental pivot for swinging movement on an axis parallel with but independent of said main pivot, means limiting the pivotal movement of said hinge support means, whereby said first cover section is limited in its upward movement about the axis of said main pivot to an angular position which is inclined below a vertical position, said first cover section being independently swingable about the axis of said supplemental pivot to a vertical position, and said second cover section being pivotally mounted and swingable rearwardly and downwardly to open position about an axis parallel to said main and supplemental pivot axes.

2. An automotive vehicle comprising a trunk compartment at the rear thereof, said trunk compartment including a trunk cavity bounded by the vehicle body, a pair of complementary cover members for said trunk compartment including a first cover section swingable forwardly and upwardly to open position about a first pivotal axis which extends transversely of the longitudinal axis of the vehicle, a second cover section swingable rearwardly and downwardly to open position about a second pivotal axis parallel to said first axis, separate latch means carried by each of said cover sections to permit independent opening and closing of each of said cover sections, each of said latch means including an operating shaft rotatably supported by and projecting through its respective cover section into the interior of the trunk compartment, an operating handle for each shaft positioned on the shaft exteriorly of the trunk cavity, the latch means of each cover section including a latch device latchingly engageable with the vehicle body, the latch means of each cover section additionally including an element thereof interlockingly engaged with the latch means of the other cover section, means connecting the operating shaft of each latch means to its respective latch device and to its respective latch element whereby movement of each operating shaft is effective to disengage its corresponding latch device from latching engagement with the vehicle body and is also effective to release its respective latch element from interlocking engagement with the latch means of the other cover section.

3. An automotive vehicle as defined in claim 2 including cable connections between said operating shaft and said latch device whereby rotation of said operating shaft is effective to disengage said latch device from latching engagement with said vehicle body.

4. An automotive vehicle comprising a trunk compartment at the rear thereof, said trunk compartment including a trunk cavity bounded by the vehicle body, a pair of complementary cover members for said trunk compartment which together form a closure for said trunk cavity, including a first and a second cover section each having an openable edge positioned adjacent and parallel to an openable edge of the other cover section, separate latch means carried by each of said cover sections to permit independent opening and closing of each of said cover sections, each of said latch means including an operating shaft rotatably supported by and projecting through its respective cover section into the interior of the trunk compartment, an operating handle for each shaft positioned on the shaft exteriorly of the trunk cavity, the operating shaft of one of said cover sections having a cam member affixed thereto interiorly of the trunk cavity, a scissor-type latch carried by said one cover section, a depending lug member carried by the other of said cover sections, means biasing said scissor-type latch into locking engagement with said lug member, said scissor-type latch including means engaged by said cam member whereby rotation of said cam member by said operating shaft of said one cover section is effective to move said scissor-type latch out of engagement with said lug member to permit opening of said one cover section.

5. An automotive vehicle comprising a trunk compartment at the rear thereof, said trunk compartment including a trunk cavity bounded by the vehicle body, a pair of complementary cover members for said trunk compartment which together form a closure for said trunk cavity including a first and a second cover section each including an openable edge positioned adjacent and parallel to an openable edge of the other cover section, separate latch means carried by each of said cover sections to permit independent opening and closing of each of said cover sections, each of said latch means including an operating shaft rotatably supported by and projecting through its respective cover section into the interior of the trunk compartment, an operating handle for each shaft positioned on the shaft exteriorly of the trunk cavity, each of said latch means including an element thereof interlockingly engaged with the other latch means, and means connected to the operating shaft of each latch means and effective upon rotation of the respective operating shaft to release said element of said latch means from interlocking engagement with said other latch means.

6. An automotive vehicle as defined in claim 5 in which the operating shaft of one of said cover sections has a cam affixed thereto interiorly of the trunk cavity a scissor-type latch carried by said one cover section, a depending lug member carried by the latch means of the other of said cover sections, means biasing said scissor-type latch into locking engagement with said lug member, said scissor-type latch including means engaged by said cam member whereby rotation of said cam member by said operating shaft of said one cover section is effective to move said scissor-type latch out of engagement with said lug member to permit opening of said one cover section.

7. An automotive vehicle as defined in claim 5 in which the operating shaft of one of said cover sections has a cam member affixed thereto interiorly of the trunk cavity, the latch means of said one cover section including a depending lug member pivotally connected to said one cover section interiorly of the trunk cavity adjacent said cam member, said lug member having an end thereof latchingly engaged with the latch means of the other cover section, said cam member engaging said depending lug member and being effective upon rotation of said operating shaft to move said depending lug member about its pivotal connection to unlatch said lug member from said latch means of said other cover section to permit opening of said one cover section.

8. A trunk compartment for an automotive vehicle or the like including wall means defining a trunk cavity, a pair of complementary cover members for said trunk compartment which together form a closure for said trunk cavity, including a first and a second cover section each having an openable edge positioned adjacent and parallel to an openable edge of the other cover section, separate latch means carried by each of said cover sections to permit independent opening and closing of each of said cover sections, each of said latch means including an operating shaft rotatably supported by and projecting through its respective cover section into the interior of the trunk cavity, an operating handle for each shaft positioned on the shaft exteriorly of the trunk cavity, each of said latch means including an element thereof interlockingly engaged with the latch means of the other cover section, and means connected to the operating shaft of each latch means and effective upon rotation of the respective operating shaft to release said element of said latch means from interlocking engagement with said latch means of said other cover section to permit opening of one of said cover sections without opening the other of said cover sections.

9. A trunk compartment for an automotive vehicle or the like as defined in claim 8 in which the operating shaft of one of said cover sections has a cam affixed thereto interiorly of the trunk cavity, a scissor-type latch carried by said one cover section, a depending lug member carried by the latch means of the other of said cover sections, means biasing said scissor-type latch into locking engagement with said lug member, said scissor-type latch including means engaged by said cam member whereby rotation of said cam member by said operating shaft of said one cover section is effective to move said scissor-type latch out of engagement with said lug member to permit opening of said one cover section.

10. A truck compartment for an automotive vehicle or the like as defined in claim 8 in which the operating shaft of one of said cover sections has a cam member affixed thereto interiorly of the trunk cavity, the latch means of said one cover section including a depending lug member pivotally connected to said one cover section interiorly of the trunk cavity adjacent said cam member, said lug member having an end thereof latchingly engaged with the latch means of the other cover section, said cam member engaging said depending lug member and being effective upon rotation of said operating shaft to move said depending lug member about its pivotal connection to unlatch said lug member from said latch means of said other cover section to permit opening of said one cover section.

11. In combination, a canopy and a support for said canopy, said canopy including a body portion formed of fabric or the like, hold-down pins for said canopy mounted on said support for receiving the edges of said canopy in sealing relation, said canopy having attached along the edges thereof a sealing strip of flexible material, grommets carried by said sealing strip and adapted to be positioned over said hold-down pins, at least some of said grommets being provided with a locking cam, each locking cam being recessed to slip over a corresponding hold-down pin and being supported by its respective hold-down pin for rotation about an axis which is eccentric of said cam, each locking cam including a peripheral edge portion thereof movable into compressing engagement with an edge of said sealing strip, each locking cam being rotatable about its eccentric axis to a locking position in which said peripheral edge portion of said cam presses said sealing strip in tight sealing relation against an adjacent surface of said support.

12. The combination defined in claim 11 in which the locking cam is rotatably mounted in its corresponding grommet and is secured against axial movement relative to said grommet.

13. The combination defined in claim 11 in which said locking cam and said hold-down pin are provided with cooperating means to hold said locking cam in said locking position.

(References on following page)

References Cited in the file of this patent

UNITED STATES PATENTS

| | | |
|---|---|---|
| 1,571,549 | Kerth | Feb. 2, 1926 |
| 1,588,740 | Johnson | June 15, 1926 |
| 1,629,403 | Marwahn | May 17, 1927 |
| 2,097,911 | Becker | Nov. 2, 1937 |
| 2,126,579 | Roethel | Aug. 9, 1938 |
| 2,353,820 | Eddins | July 18, 1944 |
| 2,647,788 | Kaiser et al. | Aug. 4, 1953 |
| 3,004,790 | Mayer | Oct. 17, 1961 |

FOREIGN PATENTS

| | | |
|---|---|---|
| 141,729 | Switzerland | Nov. 1, 1930 |
| 652,249 | France | Oct. 22, 1928 |